Feb. 29, 1944.  A. C. FLETCHER  2,342,929
APPARATUS FOR CHARGING STORAGE BATTERIES
Filed March 12, 1941
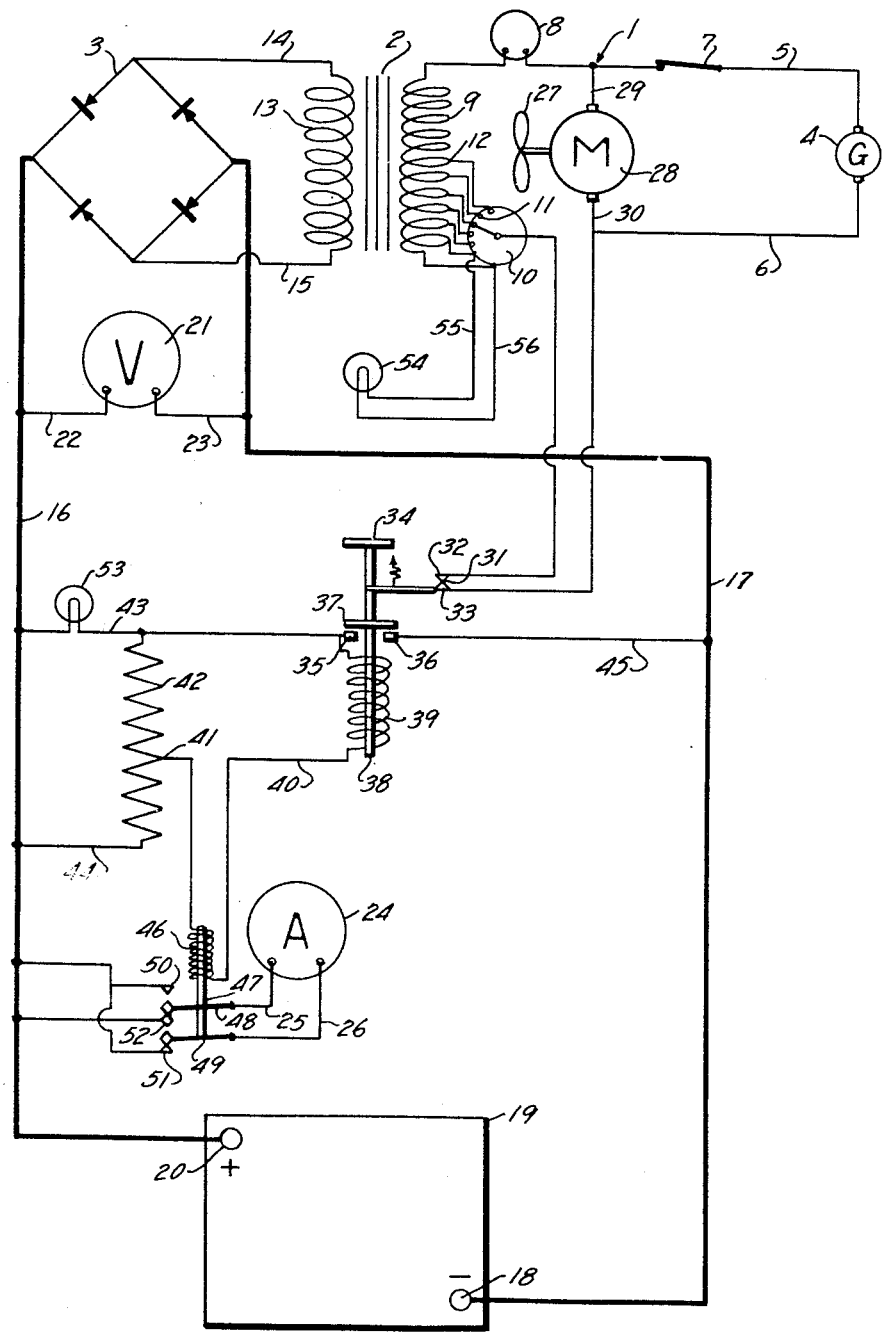
INVENTOR
Albert C. Fletcher.
BY
Arthur C. Brown
ATTORNEY Patented Feb. 29, 1944

2,342,929

UNITED STATES PATENT OFFICE 2,342,929

APPARATUS FOR CHARGING STORAGE BATTERIES

Albert C. Fletcher, Oklahoma City, Okla., assignor to Quick Charge, Inc., Oklahoma City, Okla., a corporation of Oklahoma Application March 12, 1941, Serial No. 382,954

2 Claims. (Cl. 320—5)

This invention relates to an apparatus for desulphating and charging storage batteries, and has for its principal object to charge a storage battery to its maximum capacity by providing for desulphation of the battery plates.

In accomplishing this and other objects of the invention, I have provided improved structure, the preferred form of which is illustrated diagrammatically in the accompanying drawing, wherein the single figure shows a schematic arrangement of a storage battery charging apparatus and circuits therefor.

Referring more in detail to the drawing:

1 designates a current rectifying apparatus including a transformer 2, a rectifier 3, and an alternating current source 4 for supplying the transformer. The current source is connected with the rectifying apparatus by conductors 5 and 6, the conductor 5 having a switch 7 and a time clock 8 connected therein to control the current supply and indicate time that a storage battery is undergoing a charge. The terminal of the conductor 5 is shown as directly connected with the primary winding 9 of the transformer 2, but the conductor 6 is connected with the opposite end of the primary winding through a multipoint switch 10 having contacts 11 thereof connected with leads from taps 12 on the primary winding, whereby the current passing through the primary winding is of proper value to produce the desired current voltage in the secondary winding 13 of the transformer.

The secondary winding 13 is connected by conductors 14 and 15 with the current rectifier 3 wherein the output current is converted to a direct current which is delivered to a storage battery under charge through conductors 16 and 17, the conductor 17 being shown as connected to the negative terminal 18 of a storage battery 19 and the conductor 16 to the positive terminal 20 of the battery as shown in the drawing.

The charging circuit includes a voltmeter 21 that is connected across the conductors 16 and 17 by branch conductors 22 and 23. The charging rate for the battery is indicated by an ammeter 24 having shunt connection with the conductor 16 through branch conductors 25 and 26. Since my apparatus contemplates a quick charge of the storage battery, the transformer is cooled by a fan 27 which is operated by a motor 28 having connection with the current supply conductors 5 and 6 through branches 29 and 30. When the switch 7 is closed and the storage battery 19 is connected with the conductors 16 and 17 as shown, an alternating current flows through the primary winding to effect a secondary current flow through the secondary winding 13, the current being regulated by adjusting the switch 10 so that the contact arm thereof connects with the desired tap 12 of the primary winding 9.

It is well known that sulphation of a battery begins to occur from the moment the battery is manufactured and that sulphation continues in a more or less amount throughout the useful life of the battery, consequently a battery which is connected in the charging circuit is sulphated to a greater or less degree and cannot be charged up to the maximum capacity for which the battery is designed. This difficulty becomes greater with idle batteries and batteries which are in infrequent use, as the sulphation occurs to such an extent to render them useless and incapable of taking and retaining a full charge. This is because sulphation has an insulating effect and raises the internal resistance of the battery. Thus even though a battery has had the best charge in an ordinary slow manner, the charge cannot reach the maximum capacity of the battery as long as the sulphation is present.

As above pointed out, it is the purpose of the present invention to charge a battery in such a manner that it will take its maximum charge and retain the charge over a longer period of time by removing the sulphation, as now to be described.

Connected in the current supply conductor 6 is a switch 31, including a fixed contact 32 and a movable contact 33 actuated by a push button 34 to open the primary circuit when the button is pressed. The switch also includes contacts 35 and 36 that are adapted to be interconnected by a bar 37 connected with the push button 34 and operable to close circuit through the contacts 35 and 36 when the push button is operated to open the contacts 32 and 33. Also connected with the push button 34 is an armature 38 under control of a solenoid winding 39 having one terminal connected with the contact 35 and the other terminal with the branch conductor 40 having connection with a tap 41 of a resistance element 42, the ends of which are connected with the conductor 16 by branch conductors 43 and 44, the conductor 43 also connecting the contact 35 so that the resistance 42 and solenoid winding 39 are in parallel and adapted for connection in the charging circuit when the push button 34 is depressed. The contact 36 is connected with the conductor 17 by a branch conductor 45. Connected in the conductor 40 is a solenoid winding 46 of an ammeter reversing switch having the armature 47 thereof connected with switch arms 48 and 49, the arms being interposed in the conductor circuits 25 and 26 and adapted to alternately engage contacts 50 and 51 and a contact 52, the contacts 50 and 51 being connected with the wire 26 and the contact 52 with the wire 25 so that in one position of the armature 47 circuit is made to the ammeter in one direction, as when the battery is undergoing a charge, and in another position of the armature current flows in the opposite direction through to the ammeter, as when the battery is being discharged.

Connected in the conductor 43 between the resistance element 41 and the conductor 16 is a pilot light 53. A pilot light 54 is also provided in the charging circuit which is connected with the switch 10 by branch conductors 55 and 56. The circuit just described constitutes means for effecting desulphation of the battery and functions as now to be described in the operation of my improved charging method.

Assuming that a battery 19 is to be charged, it is connected with the conductors 16 and 17 and the switch 7 is closed so that an alternating current flows through the primary winding of the transformer which effects a corresponding alternating flow at a reduced voltage in the secondary winding, which current is changed to a charging current by the rectifier 3. Current then flows in one direction through the conductor 16 across the plates of the battery and through the conductor 17. During the initial charging of the battery the switch contacts 32 and 33 are closed and the contacts 35 and 36 are opened, in which position the switch arms 48 and 49 are engaging the contacts 51 and 50, so that the ammeter shows the charging rate.

If the battery is an ordinary automobile storage battery it is given a 15 to 25 minute charge at a rate of approximately 80 amperes, or as quickly as the battery will take the charging current which varies with the sulphated condition of the battery. The next step is to immediately begin a discharge of the battery of approximately 100 amperes until it drops to a safe low. This is effected by pressing the push button 34 to open the primary circuit through the contacts 32 and 33, and closing the contacts 35 and 36 so that a predetermined rate of discharge occurs through the resistor 42 by way of the conductor 16, branch conductor 44, resistance 41, conductor 43 including the contacts 35 and 36, conductor 45 and conductor 17. Immediately upon closing the contacts 35 and 36 circuit is closed through the solenoid windings 39 and 46 from the conductor 16 through the conductor 40 and solenoid windings to the conductor 17. The solenoid winding 39 is then effective to hold the contacts 35 and 36 closed until the charge in the battery has been reduced to the point where it is ineffective to energize the solenoid, whereupon the armature is released and the switch contacts are automatically broken. Circuit is then automatically reestablished through the contacts 32 and 33 to recharge to its fullest extent.

During the discharge step the discharge rate is indicated by the ammeter because the contacts 50 and 52 have been engaged by the contact arms 48 and 49 through energization of the winding 46. The point at which the discharge step is ended is governed through connection of the solenoid winding 39 across a predetermined amount of the resistor 42, and the point at which the battery may begin discharge is governed by relative position of the tap 41, the discharge being limited within a safe range to leave some charge in the battery at the completion of the discharge and upon continuation of the charge. Charging of the battery in the manner just described effects dissolution of the sulphating film covering the plates and permits the battery to perform its normal function. The plates then become normal, the negative plates becoming sponge lead and the positive plates lead peroxide, so that the battery is capable of taking its maximum rated charge.

It is obvious that if the battery, when connected in the charging circuit, has sufficient charge to retain the solenoid 39 in energized condition to effect discharge the initial charge may be eliminated, but if the charge is insufficient to energize the coil for the time required to desulphate it is necessary to bring the charge in the battery up to the point where the discharge cycle is effective in restoring the normal condition of the battery.

From the foregoing it is obvious that I have provided an apparatus which desulphates the plates and produces a quick charge of a battery.

What I claim and desire to secure by Letters Patent is:

1. An apparatus for charging a sulphated battery including, a transformer having a primary and a secondary winding, a circuit supplying alternating current to the primary winding, a rectifier connected with the secondary winding of the transformer, a switch in the primary circuit, a circuit connecting the output of said rectifier with a battery to be charged, a resistor, a circuit connecting said resistor across said charging circuit for effecting discharge of the battery under control of said resistor, a switch in said last named circuit having interconnection with the first named switch, a solenoid connected in said last named circuit for holding the last named switch in closed position and the first named switch in open position after the first named switch is opened, said solenoid being energized by current flowing from the battery through said resistor when the last named switch is closed, and means for returning the switches to position for closing the primary circuit and for opening the resistor circuit for continuing charge of the battery.

2. An apparatus for charging sulphated batteries including, a charging circuit means supplying a charging current to said circuit, a manual switch for interrupting the current supply, a resistor, a switch connecting the resistor across the charging circuit for effecting discharge of the battery substantially simultaneous with the actuation of the first named switch, a holding circuit connected with the charging circuit and in series with said resistor, and a solenoid in the holding circuit for holding the current interrupting switch in circuit opening position and the resistor connecting switch closed, said solenoid being energized by the current discharging from the battery under control of the resistor to maintain the discharge switch closed until the battery current has reduced to a point where the solenoid is ineffective, said switches being arranged to automatically return to their original positions for continuing charge of the battery.

ALBERT C. FLETCHER.